United States Patent
Wen

(10) Patent No.: US 10,196,172 B2
(45) Date of Patent: Feb. 5, 2019

(54) CHEMICAL CONTAINER AND METHOD FOR MANUFACTURING THE SAME

(71) Applicant: Wuxi Huaying Microelectronics Technology Co., Ltd., Wuxi, Jiangsu (CN)

(72) Inventor: Sophia Wen, Wuxi (CN)

(73) Assignee: WUXI HUAYING MICROELECTRONICS TECHNOLOGY CO., LTD., Wuxi, Jiangsu (CN)

( * ) Notice: Subject to any disclaimer, the term of this patent is extended or adjusted under 35 U.S.C. 154(b) by 0 days.

(21) Appl. No.: 15/125,584

(22) PCT Filed: Mar. 10, 2015

(86) PCT No.: PCT/CN2015/073931
§ 371 (c)(1),
(2) Date: Sep. 13, 2016

(87) PCT Pub. No.: WO2015/135460
PCT Pub. Date: Sep. 17, 2015

(65) Prior Publication Data
US 2016/0376056 A1    Dec. 29, 2016

(30) Foreign Application Priority Data

Mar. 13, 2014 (CN) .......................... 2014 1 0092348
Mar. 13, 2014 (CN) .......................... 2014 1 0093750

(51) Int. Cl.
*B65D 8/02* (2006.01)
*B65D 6/00* (2006.01)
(Continued)

(52) U.S. Cl.
CPC .......... *B65D 11/08* (2013.01); *B29C 45/0053* (2013.01); *B65D 11/22* (2013.01);
(Continued)

(58) Field of Classification Search
CPC ....... B29L 2031/712; B29L 2031/7154; B29L 2031/7156; B67C 11/02; F16N 31/002;
(Continued)

(56) References Cited

U.S. PATENT DOCUMENTS 1,049,763 A * 1/1913 Phelps ..................... B65D 1/20
220/601
2,673,010 A * 3/1954 Barrow .................. B65D 7/045
137/382
(Continued)

FOREIGN PATENT DOCUMENTS

CN    1230702 A    10/1999
CN    201330006 Y   10/2009
(Continued)

*Primary Examiner* — Gideon R Weinerth
*Assistant Examiner* — Gideon Weinerth
(74) *Attorney, Agent, or Firm* — Han IP PLLC; Andy M. Han

(57) ABSTRACT

The present disclosure provides a chemical container and a method for manufacturing the same. The chemical container comprises a head portion having a top wall and a head sidewall extending from an edge of the top wall, as well as a body portion jointed with the head portion and defining a chamber together with the head portion. The top wall has a mouth structure configured for one or more pipelines to pass through and connect with the chamber. The manufacturing method is simple and of low cost, and the resulted chemical container is able to withstand a greater internal pressure and is configured to collect any leaking liquid chemicals.

9 Claims, 8 Drawing Sheets

(51) Int. Cl.
  *B29C 45/00* (2006.01)
  *B65D 6/34* (2006.01)
  *B65D 1/20* (2006.01)
  *B65D 1/16* (2006.01)
  *B29L 31/00* (2006.01)
  *B29C 65/00* (2006.01)
  *B29C 65/02* (2006.01)

(52) U.S. Cl.
  CPC ........... *B29C 65/02* (2013.01); *B29C 66/1142* (2013.01); *B29C 66/54* (2013.01); *B29C 66/543* (2013.01); *B29C 66/71* (2013.01); *B29L 2031/712* (2013.01); *B29L 2031/7154* (2013.01); *B29L 2031/7156* (2013.01); *B65D 1/16* (2013.01); *B65D 1/20* (2013.01); *Y10S 220/01* (2013.01)

(58) Field of Classification Search
  CPC ......... B65D 11/08; B65D 11/22; B65D 11/06; B65D 39/0052; B65D 1/20; B65D 1/16; B65D 11/26; B65D 39/082; B65D 25/22; B29C 45/0053; B05C 17/005; B05C 17/00503; B05C 17/00516; Y10S 220/01
  USPC ................... 220/606, 601, 4.05, 203.01, 675
  See application file for complete search history.

(56) References Cited

U.S. PATENT DOCUMENTS

| | | | | |
|---|---|---|---|---|
| 2,711,264 A * | 6/1955 | Benson | ................. | B65D 7/045 220/4.06 |
| 3,050,218 A * | 8/1962 | Harvey | ................. | B65D 7/045 222/478 |
| 3,370,737 A * | 2/1968 | Ainslie | ................. | B29C 65/56 220/4.05 |
| 4,005,813 A * | 2/1977 | Johnston | ............... | B65D 7/045 228/184 |
| 4,169,537 A * | 10/1979 | Sabreen | ................. | B65D 1/16 220/606 |
| 4,201,306 A * | 5/1980 | Dubois | ............ | B29C 66/12441 156/272.4 |
| 4,736,862 A * | 4/1988 | Hammes | ................. | B65D 1/16 220/601 |
| 4,793,491 A * | 12/1988 | Wolf | ...................... | B65D 85/84 206/509 |
| 4,840,289 A * | 6/1989 | Fait | ..................... | B29C 65/0672 220/270 |
| 4,880,580 A * | 11/1989 | Bowers | .................. | B29C 65/76 156/272.4 |
| 4,925,049 A * | 5/1990 | Przytulla | .................. | B65D 1/16 220/675 |
| 5,197,628 A * | 3/1993 | Phan | ...................... | B29C 65/34 220/589 |
| 5,553,753 A * | 9/1996 | Abplanalp | ............. | B65D 11/02 220/4.05 |
| 5,975,338 A * | 11/1999 | Przytulla | .................. | B65D 1/20 220/601 |
| 6,045,000 A * | 4/2000 | Rauworth | ................. | B65D 1/12 220/203.01 |
| 6,047,846 A * | 4/2000 | Watson | .................... | B65D 1/16 220/4.04 |
| 6,182,853 B1 * | 2/2001 | Julien | ...................... | B65D 1/16 220/605 |
| 6,192,797 B1 * | 2/2001 | Rea | ......................... | B41F 31/08 101/202 |
| 6,526,824 B2 * | 3/2003 | Chase | ................. | G01F 23/2961 141/18 |
| D526,110 S * | 8/2006 | Wentzel | ........................ | D34/39 |
| 7,921,873 B2 * | 4/2011 | Ross, Jr. | ................. | F16K 1/307 137/447 |
| 2002/0020449 A1 * | 2/2002 | Imai | ..................... | B67D 7/0283 137/590 |
| 2002/0050494 A1 * | 5/2002 | Rauworth | ................ | B65D 1/12 220/601 |
| 2002/0108670 A1 * | 8/2002 | Baker | ................. | B67D 1/0871 141/18 |
| 2004/0154381 A1 * | 8/2004 | Schneider | ........... | B65D 90/501 73/49.2 |
| 2006/0138151 A1 * | 6/2006 | Schutz | .................... | B65D 1/20 220/601 |
| 2013/0105498 A1 * | 5/2013 | Kunieda | ................ | B65D 11/06 220/601 |
| 2013/0291958 A1 * | 11/2013 | Takanohashi | ........ | B67D 7/0294 137/315.01 |
| 2015/0144644 A1 * | 5/2015 | Craig | .................. | B65D 11/06 220/677 |
| 2016/0376056 A1 * | 12/2016 | Wen | ...................... | B65D 11/08 220/606 |

FOREIGN PATENT DOCUMENTS

| | | |
|---|---|---|
| CN | 102079409 A | 6/2011 |
| CN | 102548868 A | 7/2012 |
| CN | 103879620 A | 6/2014 |
| CN | 103964039 A | 8/2014 |
| CN | 203767208 U | 8/2014 |
| CN | 203767209 U | 8/2014 |
| JP | 2005105294 | 4/2005 |
| WO | WO2015004547 A1 | 1/2015 |

* cited by examiner

100

```
┌─────────────────────────────────────────────────────┐
│ Provide a raw head portion comprising a top wall, a│
│ head sidewall extending from an edge of the top    │──110
│ wall, an outer edge wall extending from the edge of│
│ the top wall and a plurality of bulges extending   │
│ from an outer surface of the top wall outwardly    │
│ with respect to the chamber, wherein an extending  │
│ direction of the outer edge wall is opposite to    │
│ that of the head sidewall.                         │
└─────────────────────────────────────────────────────┘
                          ↓
┌─────────────────────────────────────────────────────┐
│ Realize a head portion by processing the raw head  │──120
│ portion to form a plurality of connecting holes    │
│ extending from surfaces of the bulges inwardly and │
│ a plurality of pipeline holes each extending from a│
│ respective connecting hole further inwardly and    │
│ passing through the top wall.                      │
└─────────────────────────────────────────────────────┘
                          ↓
┌─────────────────────────────────────────────────────┐──130
│ Provide a trunk portion and a bottom portion.       │
└─────────────────────────────────────────────────────┘
                          ↓
┌─────────────────────────────────────────────────────┐
│ Weld one end of the trunk portion and the head     │──140
│ portion together, and weld the other end of the    │
│ trunk portion and the bottom portion together.     │
└─────────────────────────────────────────────────────┘
                          ↓
┌─────────────────────────────────────────────────────┐
│ Provide a plurality of engagement members each     │
│ having a through hole and removably disposed in one│
│ corresponding connecting hole. With one engagement │──150
│ member disposed in one connecting hole, the        │
│ pipeline hole corresponding to the one connecting  │
│ hole and the through hole of the one engagement    │
│ member collectively form a pipeline passage        │
│ configured to allow a transmission pipeline to pass│
│ therewithin and reach the chamber.                 │
└─────────────────────────────────────────────────────┘
```

CHEMICAL CONTAINER AND METHOD FOR MANUFACTURING THE SAME

CROSS-REFERENCE TO RELATED APPLICATION

This application is the U.S. national stage application of International Application No. PCT/CN2015/073931, filed on Mar. 10, 2015. The above-identified patent application is hereby incorporated by reference in its entirety.

TECHNICAL FIELD

The present disclosure relates to a liquid container, and particularly to a chemical container and a method for manufacturing the same.

BACKGROUND

A chemical container employed for automatic liquid chemical transmission, such as a container for storing the flowing liquid for high performance liquid chromatography (HPLC), typically includes a body portion and a cap portion, with the cap portion having a plurality of channels. A pipeline for transmitting the liquid chemical would pass through one of the channels of the cap portion and enter the container, with one end of the pipeline positioned close to the bottom of the container on the inside of the container, and the other end of the pipeline connected with an inlet of a liquid pump located outside the container. The liquid chemical in the container is then transmitted to a destination outside the container by a force of suction generated by the liquid pump. In order to ensure a stable transmission speed of the liquid chemical, gas nitrogen is usually employed which is pumped into the container through another channel of the cap portion. The nitrogen produces a low level pressure at the surface of the liquid chemical inside the container, thereby ensuring a sufficient supply of the liquid chemical at the inlet of the liquid pump.

In the field of semiconductor manufacturing, a variety of liquid chemicals are often used to realize various processing steps of cleaning, etching or otherwise treating a surface of a semiconductor substrate. For high-end semiconductor products, these processing steps require an utmost cleanliness of the substrate surface. Therefore, any possible pollution to the liquid chemicals during the preparation and transmission thereof, as well as relevant safety issues, are to be avoided. For this purpose, a fully automatic control system is necessary to realize an end-to-end process of a liquid chemical, ranging from the preparation and transmission to the after-use collection of the chemical. Consequently, chemical containers that are specially made are needed to handle the liquid chemical fully automatically.

Chemical containers used in semiconductor manufacturing are required to be corrosion resistant and would not affect the purity and the ultra-cleanliness of the liquid chemicals liquids contained therein. In semiconductor manufacturing, chemical recipes containing hydrofluoric acid are often used, and the concentration of metal pollution in the liquid chemical (i.e., the hydrofluoric acid) is required to be lower than one part per billion (ppb). Therefore, a chemical container for this purpose is usually made of ultra-pure, corrosion-resistant plastic materials, such as polypropylene (PP), polytetrafluoroethylene (PTFE), perfluoroalkoxy (PFA), polyvinylidene difluoride (PVDF), and the like. A plastic container available on the market typically has one of the following two structures: either a structure consisting of a body portion and a cap portion that has a plurality of channels, or an integral structure having the body and the cap portions integrated in one piece.

In order to reduce particle pollution to a liquid chemical, one may choose to use liquid pumps as little as possible in the transmission of the liquid chemical. Instead, the liquid chemical may be transmitted by inputting nitrogen into a chemical container containing the liquid chemical. The nitrogen would produce a pressure in the chemical container and thereby pressing the liquid chemical out of the chemical container. This process, however, may cause gas leakage (i.e., leakage of the nitrogen) for the type of containers that have separate body portion and cap portion. The gas leakage may happen at the connection between the body portion and the cap portion when the pressure caused by the nitrogen inside the chemical container reaches 10 psi or so. This is because a container of this type (i.e., a container having separate body portion and cap portion) is usually quite limited in terms of the inner pressure it can bear. This not only limits a highest possible pressure level the inner pressure of the container can be raised to, but also causes safety concerns regarding vapor of the liquid chemical that is brought out by the leaking gas (i.e., nitrogen). One the contrary, an integral container with the body and the cap portions integrated in one piece would not suffer from the problem of gas leakage. However, the cost of manufacturing the integral container is very high, as a special mold is usually needed for the manufacturing.

Accordingly, it is necessary to provide an improved solution to the problems described above.

SUMMARY

This section is for the purpose of summarizing some aspects of the present disclosure and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present disclosure.

One object of the present disclosure is to provide an improved chemical container.

Another object of the present disclosure is to provide a method for manufacturing the improved chemical container.

According to one aspect of the present disclosure, a chemical container is disclosed. The chemical container includes a head portion having a top wall and a head sidewall extending from an edge of the top wall. The chemical container also includes a body portion jointed with the head portion and defining a chamber together with the head portion. The top wall has a mouth structure configured to accommodate one or more pipelines to pass through and connect with the chamber.

In a further embodiment, the head portion may include an outer edge wall extending from the edge of the top wall. An extending direction of the outer edge wall is opposite to that of the head sidewall, and the outer edge wall and the top wall of the head portion together define a groove configured to receive any liquid chemical escaping or otherwise leaking from the chemical container. The outer edge wall may include a drain hole that is connected with the groove.

In a still further embodiment, the head portion may include a plurality of bulges extending from an outer surface of the top wall. The bulges may extend outwardly with respect to the chamber. The head portion may have a plurality of connecting holes each extending from a surface of the bulges. The connecting holes may extend inwardly toward the chamber, and may extend further inwardly to form a plurality of pipeline holes each extending from a corresponding connecting hole. The pipeline holes may pass through the top wall, and an inner dimension of each of the connecting holes may be larger than an inner dimension of the respective pipeline hole. The chemical container may also comprises a plurality of engagement members each having a through hole. Each of the engagement members may be removably disposed in a corresponding connecting hole. Accordingly, a pipeline passage may be formed by a combination of the through hole of an engagement member and the pipeline hole corresponding to the one connecting hole having the engagement member disposed thereof. The pipeline passage is configured to allow a transmission pipeline to pass through or within in to reach the chamber. The chamber is formed as a closed chamber through a matching between the engagement members and the corresponding connecting holes.

According to another aspect of the present disclosure, a method for manufacturing a chemical container is disclosed. The method involves providing a head portion having a top wall and a head sidewall extending from an edge of the top wall. The method also involves providing a body portion, as well as welding the head portion and the body portion to form a chamber.

In a further embodiment, the head portion may include an outer edge wall extending from the edge of the top wall. An extending direction of the outer edge wall is opposite to that of the head sidewall, and the outer edge wall and the top wall of the head portion together define a groove configured to receive any liquid chemical escaping or otherwise leaking from the chemical container. The outer edge wall may include a drain hole that is connected with the groove.

In a still further embodiment, the method also involves processing a raw head portion to form the head portion. The raw head portion may include a top wall, a head sidewall extending from an edge of the top wall, an outer edge wall extending from the edge of the top wall and a plurality of bulges extending from an outer surface of the top wall. The bulges extend outwardly with respect to the chamber. The raw head portion may be processed to form a plurality of connecting holes extending from surfaces of the bulges inwardly toward the chamber. The raw head portion may be further processed to form a plurality of pipeline holes. Each of the pipeline holes may extend from a respective connecting hole further inwardly toward the chamber and pass through the top wall. a size of the connecting hole is larger than that of the pipeline hole, thus the head portion is obtained, the method further comprises providing a plurality of engagement members each having a through hole, the engagement members are able to be fixed into the connecting holes removably, when one engagement member is fixed into one connecting hole, the through hole of the one engagement member and the pipeline hole corresponding to the one connecting hole form a pipeline passage, the pipeline is able to extend into the chamber by passing through the pipeline passage, and wherein the chamber is closed by combination of the engagement members and the connecting holes.

Comparing with the prior art, the chemical container can meet requirements of easy manufacturing, low cost, withstanding of greater internal pressure and/or collection of leaking liquids etc.

Other objects, features, and advantages of the present disclosure will become apparent upon examining the following detailed description of an embodiment thereof, taken in conjunction with the attached drawings.

BRIEF DESCRIPTION OF THE DRAWINGS

These and other features, aspects, and advantages of the present disclosure will become better understood with regard to the following description, appended claims, and accompanying drawings where:

FIG. 1 is a flow diagram showing a method for manufacturing a chemical container according to one embodiment of the present disclosure;

DETAILED DESCRIPTION OF THE PREFERRED EMBODIMENTS

The detailed description of the present disclosure is presented largely in terms of procedures, steps, logic blocks, processing, or other symbolic representations that directly or indirectly resemble the operations of devices or systems contemplated in the present disclosure. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the present disclosure. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the present disclosure do not inherently indicate any particular order nor imply any limitations in the present disclosure.

FIG. 1 is a flow diagram showing a method 100 for manufacturing a chemical container according to one embodiment of the present disclosure. As shown in FIG. 1, the method 100 includes following operations.

Figure 2A:
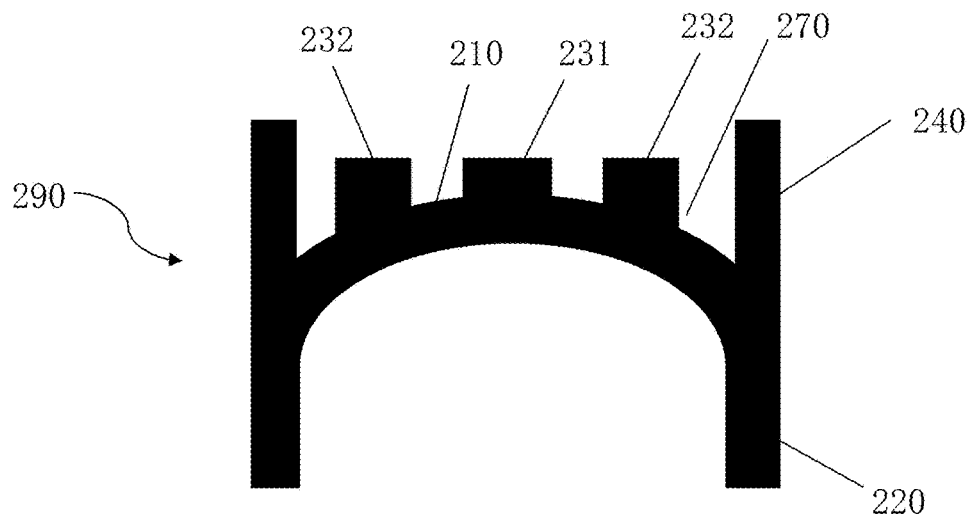
FIG. 2A and FIG. 2B respectively are a sectional view and a top view of a raw head portion of a chemical container according to one embodiment of the present disclosure.
Figure 2B:
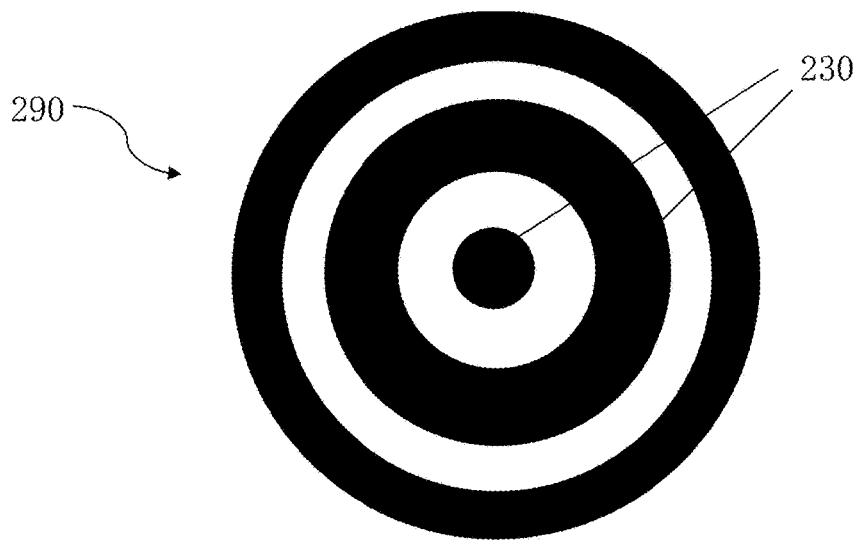

At 110, referring to FIG. 2A and FIG. 2B, a raw head portion 290 is provided. The raw head portion 290 includes a top wall 210, a head sidewall 220 extending from an edge of the top wall 210, a plurality of bulges 230 extending outwardly from an outer surface of the top wall 210, and an outer edge wall 240 extending from the edge of the top wall 210. An extending direction of the outer edge wall 240 is opposite to that of the head sidewall 220. The outer edge wall 240 and the top wall 210 together define a groove 270 that can receive chemical liquid escaping from the chemical container.

The raw head portion 290 is formed by an injection molding process.

Figure 3A:
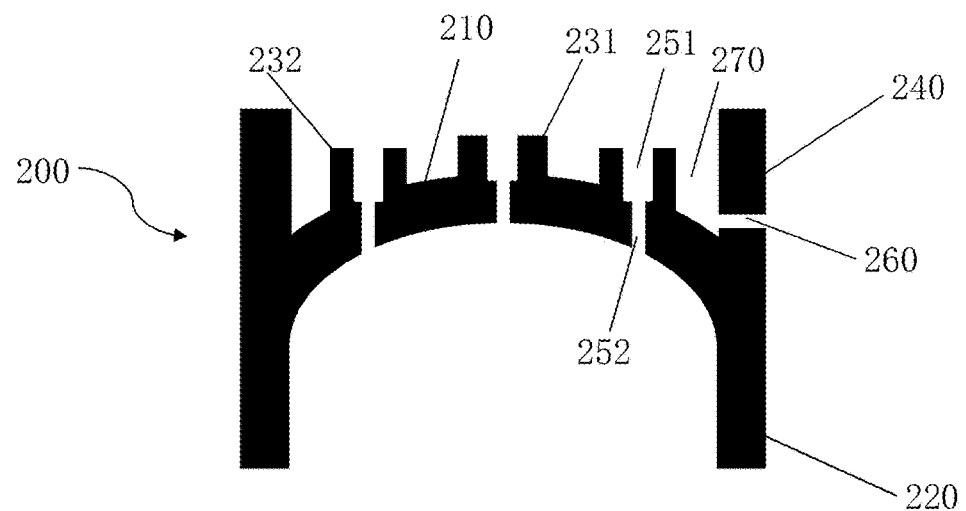
FIG. 3A and FIG. 3B respectively are a sectional view and a top view of a head portion of a chemical container according to one embodiment of the present disclosure.
Figure 3B:
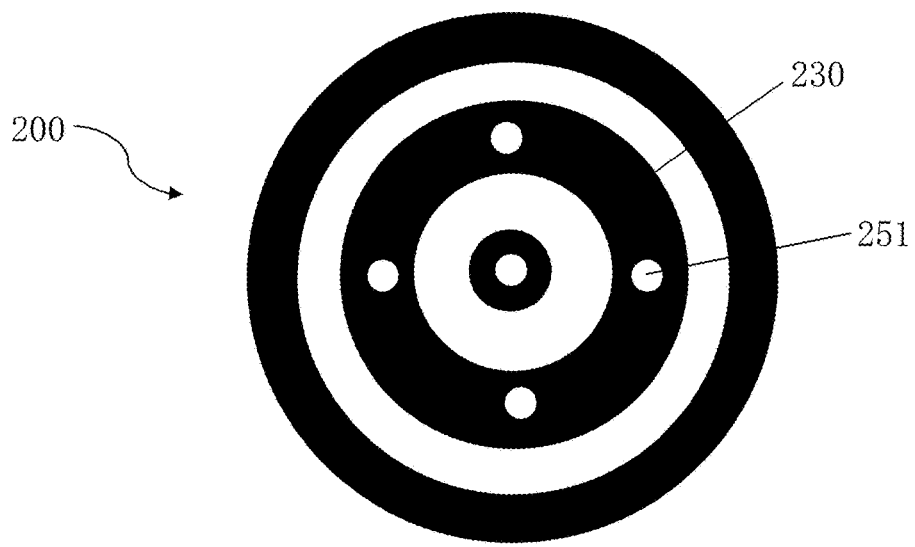

In one embodiment, referring to FIG. 3A and FIG. 3B, the bulges 230 includes a boss 231 in the middle of the top wall 210 and an annular rib 232 surrounding the boss 231.

At 120, referring to FIG. 3A and FIG. 3B, a head portion 200 is realized by processing the raw head portion 290 to form a plurality of connecting holes 251 extending from surfaces of the bulges 230 inwardly, as well as a plurality of pipeline holes 252 each extending from a respective connecting hole 251 further inwardly and passing through the top wall 210. For each connecting hole 251, an inner dimension of the connecting hole 251 is larger than that of the respective pipeline hole 252.

As shown in FIG. 3A, in one embodiment, a drain hole 260 is provided on the outer edge wall 240 that connects with the groove 270. Any liquid chemicals leaking to the groove 270 from the inside of the chemical container can be drained through the drain hole 260 to a dedicated collection site by connecting the drain hole 260 with a draining pipeline.

Also as shown in FIG. 3A, a connecting hole 251 and a corresponding pipeline hole 252 are formed on the boss 231; at least one connecting hole 251, which may be four or more, and the corresponding pipeline hole(s) 252 are formed on the rib 232.

The processing of the raw head portion 290 into the head portion 200 may be realized by a machining process. Therefore, it is rather easy to fulfill various requirements of a multi-channel transmission system by machining desired number of connecting holes 251 and pipeline holes 252 with desired sizes according to specific needs of the intended application.

At 130, a trunk portion 300 and a bottom portion 400 are provided.

Figure 4:
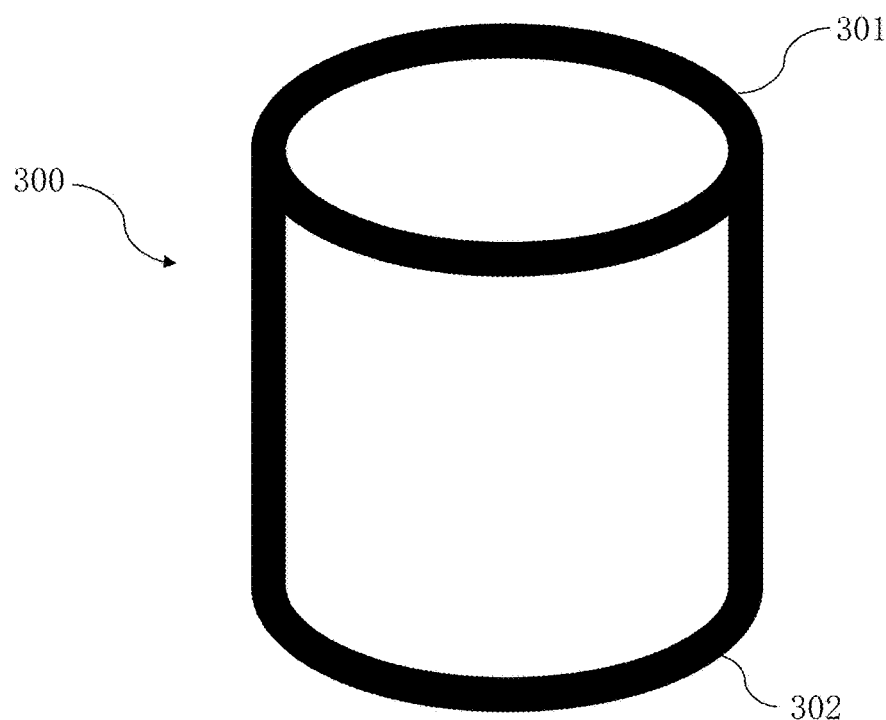
FIG. 4 is a structure diagram of a trunk portion of a chemical container according to one embodiment of the present disclosure.

As shown in FIG. 4, the trunk portion 300 is a hollow cylinder.

Figure 5:
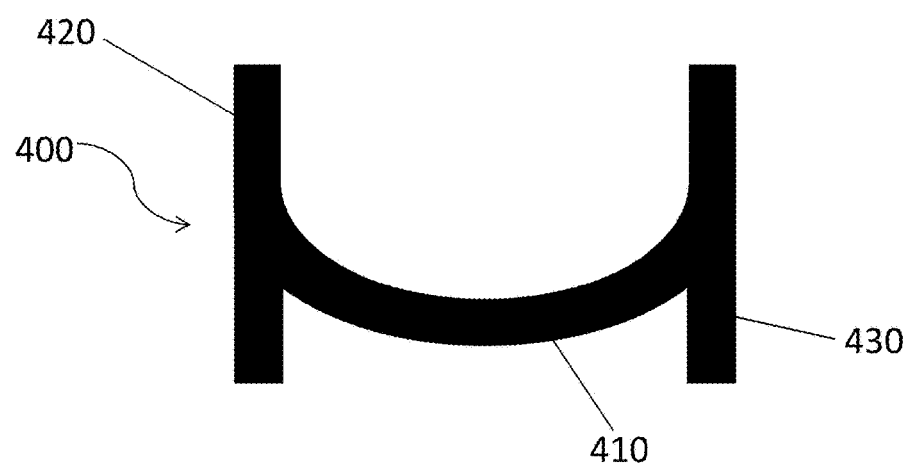
FIG. 5 is a structure diagram of a bottom portion of a chemical container according to one embodiment of the present disclosure.

As shown in FIG. 5, the bottom portion 400 includes a bottom wall 410, a bottom sidewall 420 extending from an edge of the bottom wall 410 and a support portion 430 extending from the edge of the bottom wall 410. An extending direction of the support portion 430 is opposite to that of the bottom sidewall 420.

The support portion 430 is used to support the chemical container. The bottom wall 410 is arc-shaped or concaved, and by this feature the liquid chemical inside the chemical container can be exhausted as completely as possible.

In one alternative embodiment, the trunk portion 300 and the bottom portion 400 may be integrally formed, and then the integral piece may be referred to as a body portion.

Figure 6:
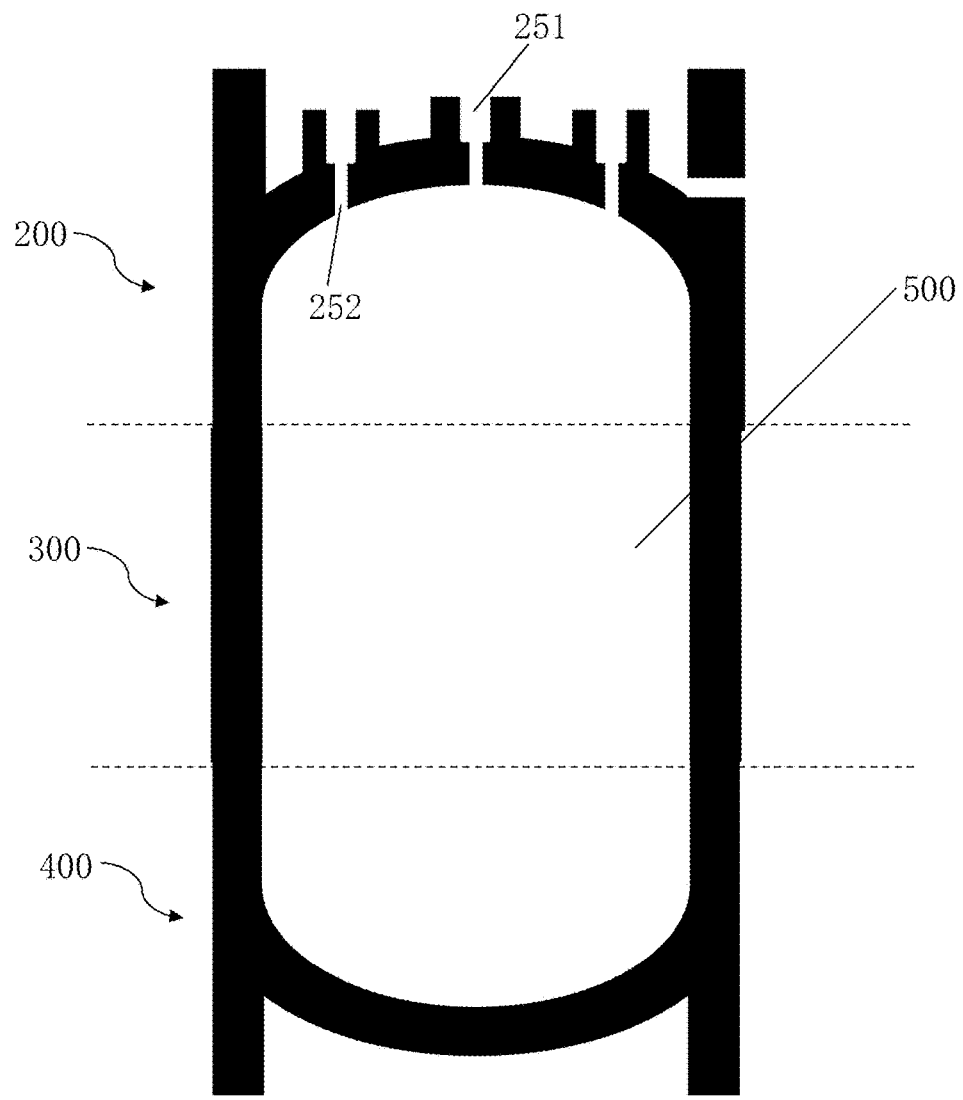
FIG. 6 is a structure diagram of a chemical container according to one embodiment of the present disclosure.

At 140, referring to FIG. 6 along with FIG. 5, one end 301 of the trunk portion 300 and the head portion 200 are welded together. In addition, the other end 302 of the trunk portion 300 and the bottom portion 400 are also welded together. As such, the trunk portion 300, the bottom portion 400 and the head portion 200 collectively define a chamber 500. The chamber 500 is configured to connect with the outside of the chemical container only through the pipeline holes 252.

In one alternative embodiment, wherein the trunk portion 300 and the bottom portion 400 are integrally formed, the body portion and the head portion 200 are welded together directly, and then the head portion 200 and the body portion together define the chamber 500.

At 150, a plurality of engagement members (not shown) are provided, with each engagement member having a through hole thereon. The engagement members are removably disposed in the connecting holes 251. With one engagement member disposed in one connecting hole 251, the pipeline hole corresponding to the one connecting hole 251 and the through hole of the one engagement member collectively form a pipeline passage. A transmission pipeline (not shown) may pass through the pipeline passage and reach the inside of the chamber 500.

In a preferred embodiment, a connecting hole 251 is provided with threads on an inner sidewall of the connecting hole, and the engagement member is provided with corresponding threads on an outer sidewall of the engagement member. The engagement member is tightly fixed in the connecting hole 251 by engaging the threads of the engagement member with the threads of the connecting hole. In addition, a sealing member (not shown), such as a gasket, may be provided below the engagement member to ensure a sealing performance of the chemical container.

Thus, a final realization of the chemical container is obtained. A liquid chemical may be injected into, and extracted from, the chemical container via transmission pipelines. The resulted chemical container can withstand a higher inner pressure. For example, even when the inner pressure reaches 50 psi, there would not be gas leakage or liquid leakage through an interface between the engagement member and the connecting hole 251.

In order to further ensure safety, the chemical container is also provided with a groove 270 shown in FIG. 3A for receiving any leaking liquid. Various kinds of liquid-detecting sensors may be disposed in the groove 270 and configured to send an alarm signal upon detecting the leaking liquid so as to prevent a large-scale chemical leakage that may be otherwise resulted.

According to the method for manufacturing the chemical container as disclosed in the present application, the head portion 200 is obtained by two processes. Firstly, the raw head portion 290 is formed by an injection molding process. Secondly, the final head portion 200 is formed from the raw head portion 290 by a machining process. Each of the bottom portion 400 and the trunk portion 300 is obtained by one process, i.e., an injection molding process.

In view of the above, in one embodiment, three molds are required to be designed and manufactured for injection molding, i.e., a head portion mold, a trunk portion mold and a bottom portion mold. After the raw head portion 290 is processed by the machining process, the head portion 200, the bottom portion 400 and the trunk portion 300 are jointed together by a welding process to form the chemical container shown in FIG. 6.

In one optional embodiment, the raw head portion 290 and the final head portion 200 may not be provided with the bulges 230, the pipeline holes 252 and the connecting holes 251. Instead, the top wall 210 may be provided with other mouth structure or structures to pass through the pipelines. The mouth structure may have external threads similar to those of a commonly available container cap to realize sealing with the head portion 200. The transmission pipelines may pass through the cap (i.e., the mouth structure) to extend into the chamber 500. In this embodiment, the head portion 200 can be injection-molded along with the body portion of the chemical container using a same mold. Furthermore, for realizing one of the features or advantages of the present disclosure, the head portion 200 may have an outer structural design that includes the groove 270 for receiving any liquid chemical leaking from the head portion of the chemical container. Sensors may be disposed in the groove 270 to readily and automatically monitor if the chemical container happens to leak.

Figure 7:
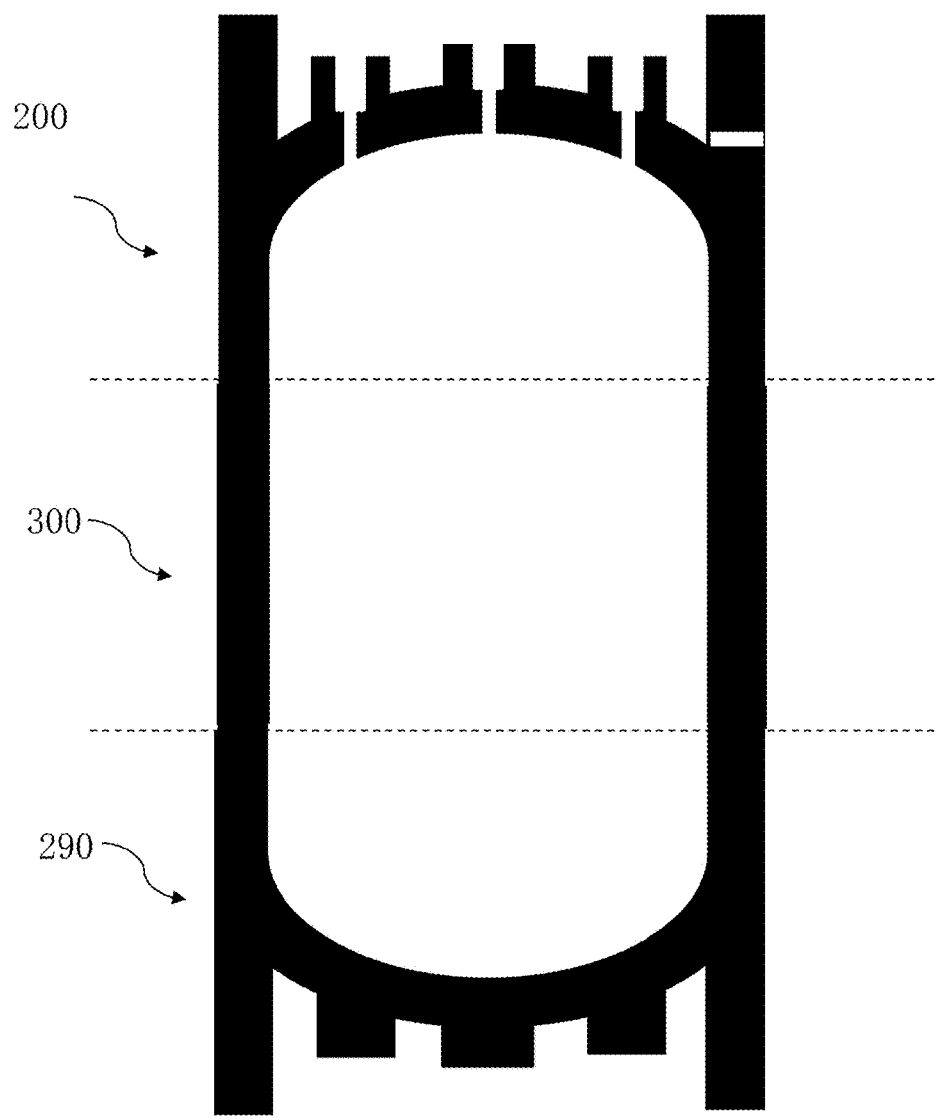
FIG. 7 is a structure diagram of a chemical container according to another embodiment of the present disclosure.

It is easily understood that the raw head portion 290 made by injection molding may readily be used in place of the bottom portion 400. Similar to the method disclose above, the raw head portion 290 that is used in place of the bottom portion 400 may be welded with the head portion 200 and the trunk portion 300 to form the chemical container. The outer edge wall 240 of the raw head portion 290 can be used to support the chemical container as shown in FIG. 7. Hence, there is no need to design a separate mold for the bottom portion of the chemical container. Instead, the bottom portion of the chemical container and the head portion 200 are injection-molded from a same mold. Consequently, only two molds are needed to realize the manufacturing of the chemical container.

Figure 8:
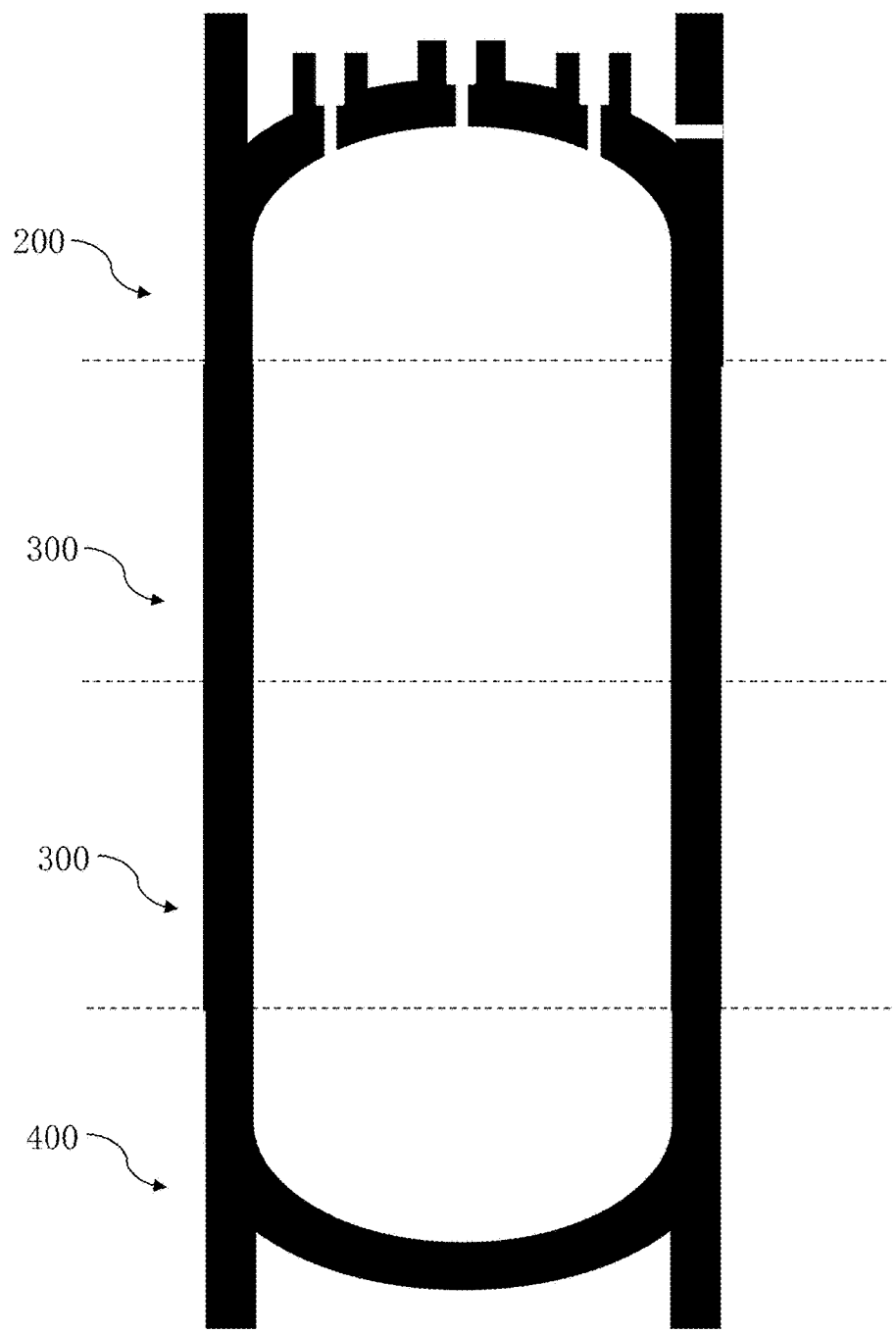
FIG. 8 is a structure diagram of a chemical container according to still another embodiment of the present disclosure.

In addition, chemical containers having different capacities are needed. To produce chemical containers of various capacities, existing manufacturing methods would require the molds and/or production lines to be changed for each container capacity. In the present disclosure, however, various container capacities can be realized by using various numbers of trunk portion 300. Namely, two or more trunk portions may be welded together to form a longer trunk. In this embodiment, the single trunk portion shown in FIG. 4 may be referred to as a "trunk portion component". As shown in FIG. 8, two trunk portion components are employed. Each trunk portion component thereof is injection-molded using a same mold. Therefore, chemical containers having different capacities can be manufactured without increasing the number of molds used in the manufacturing.

Figure 9:
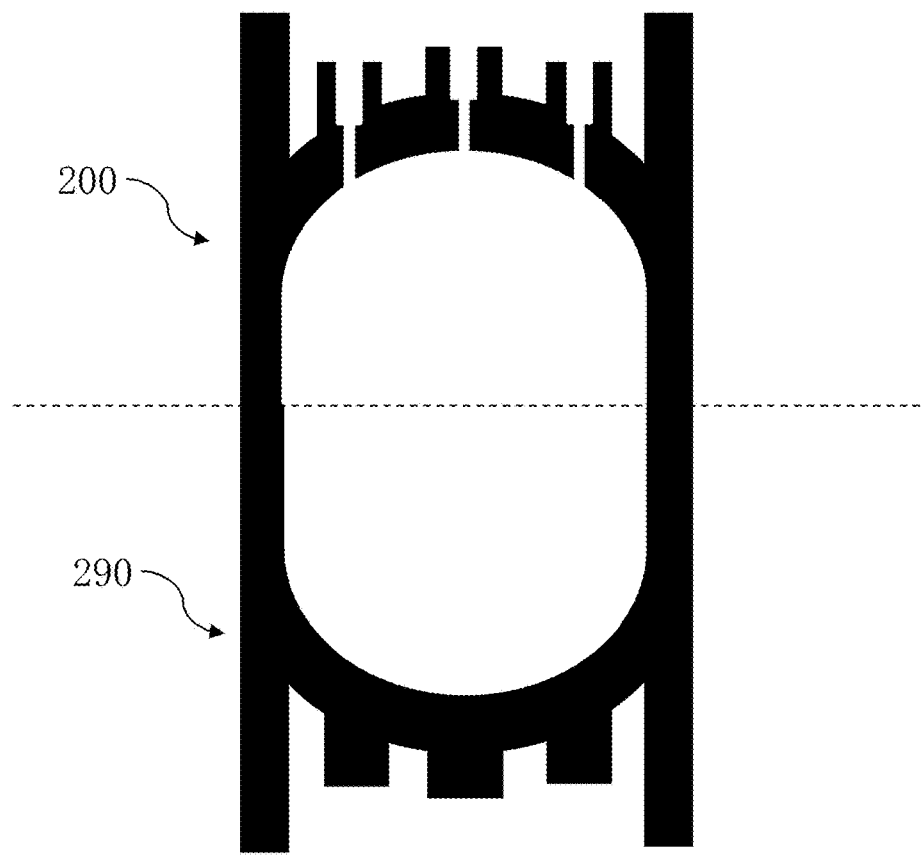
FIG. 9 is a structure diagram of a chemical container according to yet another embodiment of the present disclosure.

Moreover, as an alternative embodiment, the bottom portion 400 and the trunk portion 300 may be injection-molded together, and referred to as a whole as the body portion. To realize the chemical container, it only needs one end of the body portion to be welded together with one end of the head portion 200. Furthermore, the raw head portion 290 may also be used as the body portion directly, which may be welded together with the head portion 200 to form the chemical container shown in FIG. 9. Accordingly, only one mold is required to be developed for the manufacturing of the chemical container, thereby reducing the cost and simplifying the operation of the manufacturing.

According to another aspect of the present disclosure, with a combined reference to FIGS. 2A-9, the present disclosure also provides a chemical container. The chemical container includes a head portion 200 and a body portion that is jointed with the head portion 200. The head portion and the body portion together define a chamber 500.

The head portion 200 includes a top wall 210, a head sidewall 220 extending from an edge of the top wall 210, and a plurality of bulges 230 outwardly extending from an outer surface of the top wall 210. The head portion has a plurality of connecting holes 251 inwardly extending from surfaces of the bulges 230 and a plurality of pipeline holes 252 inwardly extending from connecting holes 251 and passing through the top wall 210. For each connecting hole 251, an inner dimension of the connecting hole 251 is larger than that of the respective pipeline hole 252. The chamber 500 is connected with the outside of the chemical container only through the pipeline holes 252.

The chemical container may also include a plurality of engagement members each having a through hole. The engagement members may be removably disposed in the connecting holes 251. With one engagement member disposed in one connecting hole 251, the pipeline hole corresponding to the one connecting hole 251 and the through hole of the one engagement member collectively form a pipeline passage. A pipeline may pass through the pipeline passage and reach the inside of the chamber 500. The chamber 500 is formed as a closed chamber through a matching between the engagement members and the corresponding connecting holes 251. In a preferred embodiment, the connecting hole 251 is provided with threads on an inner sidewall of the connecting hole, and the engagement member is provided with corresponding threads on an outer sidewall of the engagement member. The engagement member is tightly fixed in the connecting hole 251 by engaging the threads of the engagement member with the threads of the connecting hole. In addition, a sealing member (not shown), such as a gasket, may be provided below the engagement member to ensure a sealing performance of the chemical container.

In one embodiment, the head portion 200 also includes an outer edge wall 240 extending from the edge of the top wall 210. An extending direction of the outer edge wall 240 is opposite to that of the head sidewall. The outer edge wall 240 and the top wall 210 together define a groove 270 that can receive chemical liquid escaping from the chemical container. A drain hole 260 is provided on the outer edge wall 240 that connects with the groove 270. Any liquid chemicals leaking to the groove 270 from the inside of the chemical container can be drained through the drain hole 260 to a dedicated collection site by connecting the drain hole 260 with a draining pipeline.

In one embodiment, the bulges 230 includes a boss 231 in the middle of the top wall 210 and an annular rib 232 surrounding the boss 231. A connecting hole 251 and a corresponding pipeline hole 252 may be formed on the boss 231. Furthermore, at least one connecting hole 251 and a corresponding pipeline holes 252 are formed on the rib 232.

In one embodiment, the body portion includes the trunk portion 300 and the bottom portion 400. The trunk portion is a hollow cylinder. One end of the trunk portion 300 is welded together with the head portion 200, and the other end of the trunk portion 300 is welded together with the bottom portion 400.

In one embodiment, the bottom portion 400 includes a bottom wall 410, a bottom sidewall 420 extending from an edge of the bottom wall 410, and a support portion 430 extending from the edge of the bottom wall 410. An extending direction of the support portion 430 is opposite to that of the bottom sidewall. The bottom sidewall 420 and the trunk portion 300 are jointed together by welding. The bottom wall 410 is arc-shaped or concaved.

In another embodiment, the only difference between the bottom portion 400 and the head portion 200 is that, unlike the head portion 200, the bottom portion 400 is not provided with the connecting holes 251 and the pipeline holes 252. The bottom portion 400 and the head portion 200 are injection-molded from a same mold.

In one alternative embodiment, the structure of the body portion is substantially identical to the structure of the head portion 200. The only difference between the two is that, unlike the head portion 200, the body portion is not provided with the connecting holes 251 and the pipeline holes 252. The body portion and the head portion are injection-molded from a same mold. Hence, only one mold is required to be designed for the manufacturing of the chemical container, and a low manufacturing cost may be achieved.

In one optional embodiment, the raw head portion 290 and the final head portion 290 may not be provided with the bulges 230, the connecting holes 251 and the pipeline holes 252. Instead, the top wall 210 may be provided with other mouth structure or structures to pass through the pipelines. The mouth structure may have external threads similar to those of a commonly available container cap to realize sealing with the head portion 200. The transmission pipelines may pass through the cap (i.e., the mouth structure) to extend into the chamber 500. In this embodiment, the head portion 200 can be injection-molded along with the body portion of the chemical container using a same mold. Furthermore, for realizing one of the features or advantages of the present disclosure, the head portion 200 may have an outer structural design that includes the groove 270 for receiving any liquid chemical leaking from the head portion of the chemical container. Sensors may be disposed in the groove 270 to readily and automatically monitor if the chemical container happens to leak.

The present disclosure has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the present disclosure as claimed. Accordingly, the scope of the present disclosure is defined by the appended claims rather than the foregoing description of embodiments.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:
1. A chemical container, comprising:
 a head portion comprising a top wall and a head sidewall extending from an edge of the top wall; and
 a body portion jointed with the head portion and defining a chamber together with the head portion,
 wherein the top wall comprises a mouth structure configured to accommodate one or more pipelines to pass through the mouth structure and connect with an inside of the chamber, wherein the head portion further comprises a plurality of bulges extending from an outer surface of the top wall outwardly with respect to the chamber, the plurality of bulges comprising a boss located in a middle location of the top wall and an annular rib surrounding the boss, and wherein at least one connecting hole is provided on each of the boss and the annular rib, each of the at least one connecting hole configured to accommodate a respective one of the one or more pipelines.

2. The chemical container of claim 1, wherein the head portion comprises an outer edge wall extending from the edge of the top wall, wherein an extending direction of the outer edge wall is opposite to an extending direction of the head sidewall, and wherein the outer edge wall and the top wall of the head portion together define a groove configured to receive a liquid chemical escaping from the chemical container.

3. The chemical container of claim 2, wherein the outer edge wall comprises a drain hole connected with the groove.

4. The chemical container of claim 1, wherein:

each of the at least one connecting hole extends from a surface of the bulges inwardly toward the chamber and continues to extend inwardly to form a respective pipeline hole that passes through the top wall, an inner dimension of each of the connecting holes larger than an inner dimension of the respective pipeline hole, each of the at least one connecting hole is capable of receiving an engagement member that has a through hole such that a pipeline passage is formed by the through hole and the respective pipeline hole for the corresponding connecting hole, the pipeline passage configured to allow the respective one of the one or more pipelines to pass therewithin and reach the inside of the chamber, and the chamber is formed as a closed chamber through a matching between the engagement members and the corresponding connecting holes.

5. The chemical container of claim 1, wherein the body portion comprises a trunk portion and a bottom portion, the trunk portion being a hollow cylinder, wherein a first end of the trunk portion is welded together with the head portion, and wherein a second end of the trunk portion is welded together with the bottom portion.

6. The chemical container of claim 5, wherein the bottom portion comprises a bottom wall that is arc-shaped or concaved, a bottom sidewall extending from an edge of the bottom wall and a support portion extending from the edge of the bottom wall, an extending direction of the support portion being opposite to that of the bottom sidewall, and wherein the bottom sidewall and the trunk portion are welded together.

7. The chemical container of claim 5, wherein the bottom portion and the head portion are formed by injection molding using a same mold.

8. The chemical container of claim 5, wherein the trunk portion is formed by at least two cylinder components welded together.

9. The chemical container of claim 1, wherein the body portion and the head portion are formed by injection molding using a same mold.

* * * * *